United States Patent [19]

Shirasaki et al.

[11] Patent Number: 4,840,826
[45] Date of Patent: Jun. 20, 1989

[54] FIBER REINFORCED PLASTIC SOLID OR HOLLOW MOLDED ARTICLE

[75] Inventors: Yoshikazu Shirasaki; Kenichi Inuzuka, both of Ohtsu, Japan

[73] Assignee: Toyo Boseki Kabushiki Kaisha, Japan

[21] Appl. No.: 99,726

[22] Filed: Sep. 22, 1987

[30] Foreign Application Priority Data

Sep. 22, 1986 [JP] Japan ................................ 61-224195

[51] Int. Cl.$^4$ .............................................. F16L 11/00
[52] U.S. Cl. .................................. 428/36.91; 138/137; 138/140; 428/74; 428/188; 428/283; 428/288; 428/290; 428/298; 428/302
[58] Field of Search .............. 428/74, 113, 298, 302, 428/188, 283, 288, 290, 36.3, 36.4, 36.91; 138/137, 140

[56] References Cited

U.S. PATENT DOCUMENTS

| | | | |
|---|---|---|---|
| 4,407,885 | 10/1983 | Murphy et al. | 428/246 |
| 4,576,666 | 3/1986 | Harris et al. | 428/36 |
| 4,668,577 | 5/1987 | Ohta et al. | 428/364 |
| 4,685,090 | 8/1987 | Krevor | 138/137 |

Primary Examiner—George F. Lesmes
Assistant Examiner—James B. Monroe
Attorney, Agent, or Firm—Wegner & Bretschneider

[57] ABSTRACT

A fiber reinforced plastic solid or hollow molded article which comprises a plastic core part (inner part) reinforced with inorganic fibers (A) and a plastic sheath part (outer part) reinforced with polyethylene filaments having high tenacity (B).

6 Claims, 1 Drawing Sheet

FIBER REINFORCED PLASTIC SOLID OR HOLLOW MOLDED ARTICLE

FIELD OF THE INVENTION

The present invention relates to a fiber reinforced plastic solid or hollow molded article which is lightweight and has excellent impact absorption properties.

BACKGROUND OF THE INVENTION

Fiber reinforced plastics using inorganic fibers as reinforcing materials have excellent tensile properties, compression properties and flexural properties and are light-weight. Therefore, in certain fields, there have been begun to use them as structural materials instead of metallic materials. Particularly, among fiber reinforced plastics, those using carbon fibers as the inorganic fiber reinforcing materials have excellent light-weight properties in addition to the above properties comparable to metallic materials and, therefore, they are making rapid progress as structural materials for aircrafts and space vehicles.

Their use as structural materials is also gradually expanded to sports goods such as materials for fishing rods, golf club shafts, tennis rackets and the like. Further, at present, demand for them are expanded in the fields of light-weight sports bicycles, wheelchairs, robots and the like.

However, carbon fiber reinforced plastics are brittle against impact and liable to cause brittle fracture when they break, which results in defects such as scattering of pieces of broken plastics and the like, although they have the above excellent properties. As one reason of this, it can be mentioned that an elongation of carbon fibers is very low. Another reason of this is the nature of a material of a matrix, i.e., brittleness of epoxy resin, which is widely employed as a material for a matrix of a structural fiber reinforced plastic because of its excellent heat resistance and chemical resistance.

In order to remove the defects, recently, there have been developed improved carbon fibers which have a high strength and a high elongation, from the viewpoint of reinforcing fibers. From the viewpoint of resins for the matrix, there have been developed improved resins which have a high elongation with maintaining their inherent properties.

However, even if these improved materials are combined, required satisfactory toughness is not yet obtained and, on the other hand, there is a limit in improvement of materials.

Then, at present, development of fiber reinforced plastics is carried out predominantly by effectively utilizing already existing materials such as a carbon fibers compounded (hybridized) with aramide fibers which have high impact properties.

In reinforced plastics hybridized with aramide fibers, impact properties are considerably improved in comparison with plastics reinforced with 100% of carbon fibers. However, in order to impart required toughness, it is necessary to incorporate a considerable amount of aramide fibers with carbon fibers at the sacrifice of compression properties and flexural properties of fiber reinforced plastics. Further, aramide fibers have a high water absorbing capacity at standard conditions such as 3.5% and there is such a problem that properties thereof are deteriorated with time due to water absorption under conditions of use. Furthermore, among organic fibers, aramide fibers have a very high specific gravity such as 1.45 and this should be improved because it is desired to make fiber reinforcing materials as light as possible.

OBJECTS OF THE INVENTION

The main object of the present invention is to provide fiber reinforced plastics which are light-weight and have improved impact resistance with preventing deterioration of properties due to water absorption with time.

This object as well as other objects and advantages of the present invention will become apparent to those skilled in the art from the following description by reference with the accompanying drawings.

SUMMARY OF THE INVENTION

Figure 1:
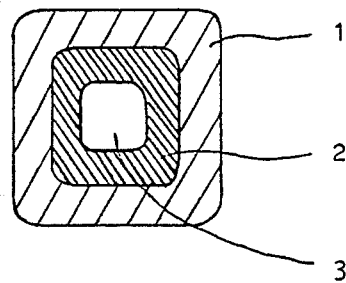
FIG. 1 is a schematic cross section of one embodiment of the hollow fiber reinforced plastic rod of the present invention.

According to the present invention, there is provided a fiber reinforced plastic solid or hollow molded article which comprises a plastic core part (inner part) reinforced with inorganic fibers (A) and a plastic sheath part (outer part) reinforced with polyethylene filaments having high tenacity (B).

In comparison with plastics reinforced with carbon fibers compounded with aramide fibers, the fiber reinforced plastic of the present invention has much improved impact resistance and low water absorption, and is light-weight.

DETAILED DESCRIPTION OF THE INVENTION

As the inorganic fibers (A) in the present invention, there can be used, for example, glass fibers, carbon fibers, boron fibers and the like. Carbon fibers which have high strength and high modulus and is lightweight are particularly preferred.

On the other hand, as the polyethylene filaments having high tenacity (B) in the present invention, there can be used those having a tensile strength of at least 20 g/denier, preferably at least 30 g/denier, more preferably at least 40 g/denier and a tensile modulus of at least 500 g/denier, preferably at least 800 g/denier, more preferably at least 1,000 g/denier from the viewpoint of keeping in harmony with properties of the inorganic fibers (A). Further, it is desirable that the filaments have an impact absorption energy of at least $40 \times 10^{-5}$ joule/denier, preferably at least $50 \times 10^{-5}$ joule/denier, more preferably at least $60 \times 10^{-5}$ joule/denier. When the impact absorption energy is less than $40 \times 10^{-5}$ joule/denier, it is difficult to obtain the impact strength ratio of the fiber reinforced plastic of at least 3 which is expected as the goal of the present invention.

Particularly, it is preferred that the high tenacity polyethylene filaments used in the present invention have those of a high molecular polyethylene having a viscosity average molecular weight of at least $5 \times 10^5$ because of the cost and the ease of production. A single yarn denier of the high tenacity polyethylene filaments is not limited to a specific one. However, preferably, it is 0.2 to 20 denier, more preferably 0.5 to 10 denier.

By the way, in the case of high tenacity polyethylene filaments, sometimes, adhesion between the filaments and a matrix resin is insufficient. Accordingly, in order to improve adhesion to a matrix resin, it is recommended to provide numberless multiple longitudinal grooves to surfaces of the filaments. Such grooves can be provided during production of the filaments by stretching gel filaments containing an appropriate amount of a solvent with controlling the amount of evaporation of the solvent. Further, as means for improvement of adhesion, it is also recommended to treat surfaces of the filaments with fluorine gas, or to subject the filaments to surface treatment with a polyolefin containing epoxy group, a polyolefin containing carboxyl group, a chlorinated polyolefin or the like.

As the matrix resin in the present invention, i.e., the plastic for the core part or the sheath part, there can be used any resin which is finally solidified at a temperature not higher than 145° C. by setting or desolvation. Examples of the resin include polyether polyurethanes, polyester polyurethanes, aliphatic hydrocarbon polymers, aliphatic hydrocarbon copolymers, unsaturated polyester resins, vinyl ester resins, epoxy resins, phenol resins, urethane acrylate resins and the like. In order to obtain a desired fiber reinforced plastic having improved impact resistance, it is preferred to use a thermosetting resin having improved toughness, particularly epoxy resin.

In the present invention, a volume content ratio of the inorganic fibers (A) and the high tenacity polyethylene filaments (B) is not limited. However, preferably, the ratio (A)/(B) is 75/25 to 95/5, more preferably, 80/20 to 90/10 from the viewpoint of properties of the resulting reinforced plastic. When (B) is less than 5%, the impact strength ratio becomes inferior. On the other hand, when (B) is more than 25%, flexural properties become inferior, although the impact strength ratio is improved.

The impact strength ratio of the fiber reinforced plastic of the present invention can be expressed by the ratio of impact resistance of the desired fiber reinforced plastic to that of a corresponding plastic reinforced only by the inorganic fibers. Preferably, the ratio is at least 3, particularly, at least 4.

The reinforcing fibers in the article of the present invention can be used in the form of yarns, strands, unidirectional sheet, woven textile (plain-weave, satin weave, twill weave, etc.) and the like, and they can be appropriately chosen according to a particular use of the article.

The fiber reinforced plastic molded article of the present invention can be produced, for example, by laminating half-cured so-called prepreg sheets of carbon fibers impregnated with epoxy resin to obtain the core part (inner part), laminating one or more layers of the similar prepreg sheets, the reinforcing fibers of which are the high tenacity polyethylene filaments, on the core part to form the sheath part (outer part), and then subjecting the laminate to thermoforming to obtain the article having a multi-layer construction. However, the process for producing the fiber reinforced plastic molded article of the present invention is not limited to this process. By the way, as the reinforcing fiber material for the sheath part, there can be used other filaments or fibers such as carbon fibers, aramide fibers, glass fibers and the like in combination with the high tenacity polyethylene filaments.

The core-sheath structure of the article of the present invention may be a solid core-sheath or hollow core-sheath structure and it can be appropriately chosen according to a particular use of the article. Further, another material such as a foamed polystyrene or the like can be provided in the hollow part of the core.

The shape of the fiber reinforced plastic molded article of the present invention can be chosen according to a particular use of the article but, preferably, the article is in the form of a solid or hollow rod or pipe. Usually, the article can be molded in a rod or pipe having a radial diameter of about 1 mm to 50 cm.

Particularly, in the present invention, a hollow rod or pipe is preferred in view of the objective use of the article. The "hollow" used herein means that the cross section area of the hollow part is 5 to 95%, preferably, 50 to 95% based on the total cross section area.

Figure 2:
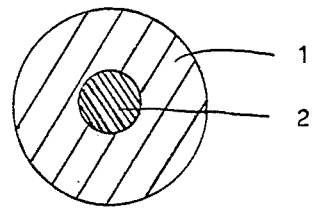
FIG. 2 is a schematic cross section of one embodiment of the solid reinforced plastic rod of the present invention.

A cross section of one embodiment of the hollow fiber reinforced plastic rod of the present invention is shown in FIG. 1. The plastic rod has the sheath part 1 on the core part 2 which encompasses the hollow part 3. A cross section of another embodiment of the article of the present invention is shown in FIG. 2. The plastic article of this embodiment is a solid reinforced plastic rod having the sheath part 1 on the solid core part 2.

The fiber reinforced plastic molded article of the present invention can be utilized according to the same manner as in conventional fiber reinforced plastic molded articles.

The following Examples and Comparative Examples further illustrate the present invention in detail but are not to be construed to limit the scope thereof.

The evaluation of properties of reinforced plastics obtained in these Examples and Comparative Examples were carried out as follows.

Impact strength ratio

The impact strength was measured according to the same manner as described in JIS K 7111-1984 "Charpy Impact Test Method for Rigid Plastics".

The conditions for the measurement were as follows.
Impact manner: flatwise impact
Hammer weight: 150 kg cm
Lift up angle: 150°
Impact rate: 3.7 m/sec.
Impact specimen: pipe structure, no notch
Size of specimen: diameter 10 mm$\phi$, wall thickness 1 mm, and length 50 mm
Distance between supports: 40 mm Impact strength was calculated by the following formula.

$$\text{Impact strength ratio} = \frac{\text{absorption energy of compounded fiber reinforced plastic}}{\text{absorption energy of inorganic fiber reinforced plastic}}$$

Strength and elongation

These were measured according to JIS L-1013-1981 "7.5 Tensile Strength and Elongation".

Impact absorption energy

This was measured according to JIS L-1013-1981 "7.8 Impact Strength".

EXAMPLE 1

A ultra-high-molecular-weight polyethylene having a flexible high molecular chain of viscosity average molecular weight of $1.8 \times 10^6$ was dissolved in decalin to obtain a spinning solution (xylene, paraffin or the like can be also used). The concentration of the spinning solution was adjusted so as to prevent solidification of the polyethylene solution in a spinning apparatus, and was spun from a spinneret into atmosphere at room temperature and cooled to form gel filaments. The gel filaments containing decalin were stretched at the total draw ratio of 30 to 40 at such a temperature that breakage of gel filaments due to melting was prevented to obtain high tenacity polyethylene filaments having the tensile strength of 35 g/denier, the tensile modulus of 1,350 g/denier, the elongation at break of 3.2% and size of 150 denier. By using the resulting filaments, an plain-weave textile having the fabric density of warp and weft of 34 counts/inch and areal density of 45 g/m² was woven. By using the woven textile, a fiber reinforced plastic pipe was produced as follows.

A unidirectional epoxy prepreg sheet of carbon fibers having the setting temperature of 120° C. was plied on a mandrel having the diameter of 8.0 mmφ and an epoxy prepreg of the above high tenacity polyethylene filaments textile was wound once thereon. Then, setting was effected at 120° C. for 3 hours to obtain a fiber reinforced plastic pipe having the wall thickness of 1.05 mm, the diameter of 10.1 mmφ, and the fiber volume content ($V_f$) of 60%. The volume content ratio of carbon fibers/ high tenacity polyethylane fibers was 90/10.

As a control, according to the same manner as described above, a fiber reinforced plastic pipe reinforced with 100% of carbon fibers was produced. The control pipe had the wall thickness of 1.0 mm, the diameter of 10.0 mmφ and $V_f$ of 60%. The result of the measurement of impact properties showed the impact strength ratio of 2.8.

EXAMPLE 2

The epoxy resin impregnated prepreg sheet of the high tenacity polyethylene fiber textile as obtained in Example 1 was wound twice on the carbon fiber prepreg as in Example 1. Setting was effected at 120° C. for 3 hours to obtain a fiber reinforced plastic pipe having the wall thickness of 1.1 mm, the diameter of 10.2 mmφ and $V_f$ of 60%. The volume content ratio of carbon fibers/ high tenacity polyethylene fibers was 80/20. The impact strength ratio was 4.0.

COMPARATIVE EXAMPLE 1

According to the same manner as described in Example 1, a fiber reinforced plastic pipe having the wall thickness of 1.05 mm, the diameter of 10.1 mmφ and $V_f$ of 60% was produced except that a commercial available plain weave textile of Kevlar 49 using , 195 denier (Du Pont #120) was used as the reinforcement of epoxy resin instead of the high tenacity polyethylene fiber textile. The volume content ratio of carbon fibers/Kevlar 49 was 89/11 and the impact strength ratio was 2.1.

COMPARATIVE EXAMPLE 2

According to the same manner as described in Example 2, a fiber reinforced plastic pipe having the wall thickness of 1.1 mm, the diameter of 10.2 mmφ and $V_f$ of 60% was produced except that Kevlar 49 was used instead of the high tenacity polyethylene fibers. The volume content ratio of carbon fibers/Kevlar 49 was 78/22 and the impact strength ratio was 3.0.

EXAMPLE 3

Polyethylene having the viscosity average molecular weight of 45,000 was spun according to the same manner as described in Example 1 to obtain polyethylene filaments having the tensile strength of 19 g/denier, tensile modulus of 480 g/denier, elongation at break of 6.2% and size of 150 denier. According to the same manner as in Example 1, by using carbon fibers and the polyethylene filaments thus obtained, there was obtained a fiber reinforced plastic pipe having the wall thickness of 1.05 mm, the diameter of 10.1 mmφ and $V_f$ of 60%. The volume content ratio of carbon fibers/polyethylene fibers was 90/10 and the impact strength ratio was 1.8.

COMPARATIVE EXAMPLE 3

By using the high tenacity polyethylene filaments obtained in Example 1, there was obtained an epoxy resin impregnated unidirectional prepreg sheet having the setting temperature of 120° C. The prepreg was plied on a mandrel having the diameter of 8.0 mmφ and an epoxy prepreg of the high tenacity polyethylene filaments textile of Example 1 was wound once thereon. Setting was effected at 120° C. for 3 hours to obtain a fiber reinforced plastic pipe having the wall thickness of 1.05 mm, the diameter of 10.1 mmφ and $V_f$ of 60%. The impact strength ratio was 2.1.

COMPARATIVE EXAMPLE 4

By using the high tenacity polyethylene filaments obtained in Example 1, there was obtained an epoxy resin impregnated unidirectional prepreg sheet having the setting temperature of 120° C. The prepreg was plied on a mandrel having the diameter of 8.0 mmφ and an epoxy prepreg sheet of plain weave textile (fabric density: 18 yarn/inch) of carbon fibers (1,000 fibers) was wound once thereon. Setting was effected at 120° C. for 3 hours to obtain a fiber reinforced plastic pipe having the wall thickness of 1.1 mm, the diameter of 10.2 mmφ and $V_f$ of 60%. The volume content ratio of carbon fibers/polyethylene filaments was 87/13 and the impact strength ratio was 1.8.

The results of these Examples and Comparative Examples are summarized in Table 1.

TABLE 1

|  | Control | Ex. 1 | Ex. 2 | Ex. 3 | Comp. Ex. 1 | Comp. Ex. 2 | Comp. Ex. 3 | Comp. Ex. 4 |
| --- | --- | --- | --- | --- | --- | --- | --- | --- |
| Construction of reinforced plastics |  |  |  |  |  |  |  |  |
| Inorganic[1] reinforcing fibers (A) | C | C | C | C | C | C | — | C |
| Compounded[1] reinforcing fibers (B) | — | H | H | P | K | K | H | H |

TABLE 1-continued

|  | Control | Ex. 1 | Ex. 2 | Ex. 3 | Comp. Ex. 1 | Comp. Ex. 2 | Comp. Ex. 3 | Comp. Ex. 4 |
| --- | --- | --- | --- | --- | --- | --- | --- | --- |
| (A)/(B) | 100/0 (A) | 90/10 (B) | 80/20 (B) | 90/10 (B) | 89/11 (B) | 78/22 (B) | 0/100 (B) | 13/87 (B) |
| Impact absorption energy of fiber ($\times 10^{-5}$ joule/denier) | 6 | 56 | 56 | 38 | 21 | 21 | 56 | 56 |
| Properties of reinforced plastics |  |  |  |  |  |  |  |  |
| Charpy impact absorption energy (kg · cm) | 7.3 | 20.4 | 29.2 | 13.1 | 15.3 | 21.9 | 15.6 | 13.5 |
| Impact strength ratio | — | 2.8 | 4.0 | 1.8 | 2.1 | 3.0 | 2.1 | 1.8 |
| Water absorption (%) | 0.2 | 0.2 | 0.2 | 0.2 | 0.4 | 0.6 | 0.2 | 0.2 |
| Evaluation of[2] flexural elasticity | A | B | B | B | B | B | C | C |

In Table 1, the symbols represent as follows.
[1]C is carbon fibers.
H is high tenacity polyethylene fibers.
P is polyethylene fibers.
K is Kevlar 49.
[2]A represents "very good and high elasticity".
B represents "good and high elasticity".
C represents "no good and low elasticity".

As seen from Table 1, the high tenacity polyethylene filaments used in the present invention can improve impact properties of carbon fiber reinforced plastic pipe in a smaller amount than that of Kevlar 49 in Comparative Examples 1 and 2.

That is, the impact strength ratio of the volume content ratio (A/B) of 90/10 in the present invention is comparable to that of 78/22 of Comparative Example 2. Further, increase in the impact strength ratio in the present invention due to twice increase in the number of turns (Examples 1 and 2) is greater than that in Comparative Examples 1 and 2. When using polyethylene filaments which do not meet the requirements of the present invention (Example 3), the impact strength ratio of the resulting pipe becomes markedly inferior in comparison with that of Example 1 which has the same volume content ratio as in Example 3. The impact strength ratio of the pipe of Cmparative Example 3 wherein the high tenacity polyethlene filaments are used alone is not so high even in comparison with the pipes of Comparative Examples 1 and 2. In addition, flexural and compression properties thereof are remarkably inferior to those of the pipe reinforced with 100% of carbon fibers.

In the pipe of Comparative Example 4, the combination of the core and sheath materials are reversed in comparison the pipe of Example 1. However, the properties thereof are almost the same as those of Comparative Example 3.

What is claimed is:

1. A fiber reinforced plastic solid or hollow molded article which comprises,
    a plastic core part reinforced with inorganic fibers (A); and
    a plastic sheath part reinforced with polyenthylene filaments having high tenacity (B), wherein
    the volume of the fibers (A)/filaments (B) is 75/25 to 95/5 and wherein the high tenacity polyethylene filaments have a tensile strength of at least 20 g/denier and a tinsel modulus of at least 500 g/denier.

2. An article according to claim 1, wherein the inorganic fibers (A) are carbon fibers.

3. An article according to claim 1, wherein the volume content ratio of the filaments (A)/the filaments (B) is 80/20 to 90/10.

4. An article according to claim 1, wherein the impact absorption energy of the high tenacity polyethylene filaments (B) is at least $40 \times 10^{-5}$ joule/denier.

5. An article according to claim 1, wherein the core part is hollow.

6. An article according to claim 1, wherein the article is in the shape of a rod or pipe.

* * * * *